United States Patent
Kawai

(10) Patent No.: US 10,177,536 B2
(45) Date of Patent: Jan. 8, 2019

(54) SPARK PLUG, SPARK PLUG GASKET, AND MANUFACTURING METHOD THEREOF

(71) Applicant: DENSO CORPORATION, Kariya, Aichi-pref. (JP)

(72) Inventor: Kazuhide Kawai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/661,262

(22) Filed: Jul. 27, 2017

(65) Prior Publication Data

US 2018/0034245 A1 Feb. 1, 2018

(30) Foreign Application Priority Data

Jul. 28, 2016 (JP) .................. 2016-148862

(51) Int. Cl.
| | |
|---|---|
| H01T 13/08 | (2006.01) |
| F16J 15/06 | (2006.01) |
| F16J 15/10 | (2006.01) |

(52) U.S. Cl.
CPC ............ H01T 13/08 (2013.01); F16J 15/061 (2013.01); F16J 15/104 (2013.01)

(58) Field of Classification Search
CPC ................... H01T 13/08; F16J 15/104
See application file for complete search history.

(56) References Cited

U.S. PATENT DOCUMENTS

| | | | |
|---|---|---|---|
| 9,190,812 B2* | 11/2015 | Miyashita | ............... H01T 13/08 |
| 2008/0098974 A1* | 5/2008 | Fukuzawa | ............... H01T 13/08 |
| | | | 123/169 R |
| 2014/0020646 A1 | 1/2014 | Kawashima | |
| 2014/0042894 A1 | 2/2014 | Miyashita et al. | |
| 2014/0142405 A1* | 5/2014 | Brister | ................. A61B 5/0002 |
| | | | 600/365 |
| 2014/0145583 A1 | 5/2014 | Kobayashi | |
| 2015/0372457 A1* | 12/2015 | Shimamura | ............. H01T 13/08 |
| | | | 313/143 |

FOREIGN PATENT DOCUMENTS

| | | | | |
|---|---|---|---|---|
| EP | 2736131 A2 * | 5/2014 | ............ | H01T 13/08 |
| GB | 2079873 A * | 1/1982 | .......... | F16J 15/0887 |
| JP | 06283249 A * | 10/1994 | | |

\* cited by examiner

*Primary Examiner* — Mariceli Santiago
(74) *Attorney, Agent, or Firm* — Nixon & Vanderhye P.C.

(57) ABSTRACT

An angular gasket for a spark plug used for mounting a spark plug to a wall of a combustion engine. The gasket provided with a first section with predetermined thickness, having a plurality of concave portions provided as grooves intermittently disposed along a circumferential direction on a first surface being a wall section of the gasket, at an inner circumferential edge thereof. The gasket further provided with convex portions on a section of the inner radial side, with respect to the concave portions projecting toward the inner radial side thereof, at the inner circumferential edge, and a second section being thinner than the a thickest part of the gasket, and greater in thickness than the first section, disposed between the plurality of concave portions of the inner circumferential edge surface.

18 Claims, 6 Drawing Sheets

(a)

(b)

SPARK PLUG, SPARK PLUG GASKET, AND MANUFACTURING METHOD THEREOF

CROSS-REFERENCE APPLICATION

The application is based on and claims the benefit of the priority of earlier Japanese application 2016-148862 filed on Jul. 28, 2016, the description of which is incorporated herein by reference.

BACKGROUND

Technical Field

The present invention relates to a gasket for mounting a spark plug onto an internal combustion engine, and a spark plug provided with a gasket which maintains an airtight environment between the combustion chamber and the spark plug.

Spark plugs are used in internal combustion engines to ignite an air-fuel mixture in the combustion chamber of the engine, by generating a spark discharge across a spark discharge gap. When the spark plug is installed in the internal combustion engine, a male thread portion disposed on an outer periphery of the spark plug is fitted to a female thread portion disposed on an inner periphery of a mounting thread hole of the engine.

An airtight environment between the spark plug the engine is vital for normal function and prevention of a gas leak, for example. In order to secure an airtight environment between the engine and the spark plug, a gasket is frequently disposed between an engine base surface on a periphery of an aperture thread hole of the engine and a base surface of the spark plug provided at a base end side of a male thread portion.

An example of a gasket is disclosed in JP-5629300-B. The gasket disclosed in JP-5629300-B is configured with a plurality of groove portions provided intermittently along a circumferential direction of inner side of a front end surface, which is a surface on a front end side of the spark plug, and a plurality of convex portions projected from an inner side of the gasket provided intermittently along a circumferential direction thereof. In this configuration, an inner diameter of the gasket is smaller than an outer diameter of the male thread portion of the spark plug, in an area in which the convex portions are provided, thus, dislodgment from the male thread portion is prevented.

However, the gasket disclosed is provided with groove portions intermittently disposed along a circumferential direction of an inner circumferential side of the front end surface, thus indentation may occur on surface at a rear end of the gasket when the groove portions are formed. As a result, the rear end surface may not be kept in flat. In such a case, a gap, for example, may occur in the area where the indentation is formed when a base end surface of the spark plug and the rear end side of the gasket make contact, and the airtightness decrease between the engine and the spark plug as a consequence. Considering that airtightness between a spark plug and engine is critical, there is an increased demand for a gasket configured with further improved airtightness.

SUMMARY

In view of the foregoing, an object of the present invention is to provide a gasket for a spark plug having improved airtightness between the engine and the spark plug, and a spark plug provided with a gasket. A second object of the present disclosure is to provide a manufacturing method of the gasket.

The present invention is a gasket for spark plug, and more specifically an angular gasket used when mounting the spark plug onto a wall of a combustion chamber of an engine. The gasket is provided with a first section which is a section thinned to a predetermined thickness, having a plurality of concave portions provided as grooves intermittently disposed along a circumferential direction formed on a first surface being a surface on a side of a wall section of the gasket, at an inner circumferential section of the gasket, convex portions on a section of an inner radial side of the gasket, with respect to the concave portions projecting toward the inner radial side thereof, at the inner circumferential edge surface of the gasket, and a second section being thinner than a thickest part of the gasket, and thicker than the first section, disposed between the plurality of concave portions on the inner circumferential edge surface of the gasket.

The angular gasket is used to secure the air tightness between the combustion chamber and the spark plug when the spark plug is fixed to the wall of the combustion chamber.

On the inner circumferential edge surface of the gasket, the concave portions which are intermittent grooves along the circumferential direction are formed on the first surface being a surface on the side of the wall section of the gasket. The first surface is provided with the first section formed in plurality thereon. Since the plurality of concave portions are formed on the gasket, the convex portions are formed on a section of the inner radial side of the gasket, with respect to the concave portions, each of which projects to the inner radial side thereof, to prevent slipping of the gasket.

When the concave portions are formed by pressing the gasket with a pressing jig, it is considered that the gasket is in close contact with a base surface of the spark plug. In this case, when the first surface of the gasket is pressed with the pressing jig, an opposed side of the first surface (referred to a second surface hereon) presses towards the base surface of the spark plug. At this point, indentation occurs in an area which opposes the side of the concave portions, and a thickness of the section in which the concave portions are disposed thereon is thinned to a predetermined thickness. However, since the section in which the concave portions are disposed is thinner than other remaining parts of the gasket, a flat surface on an inner circumferential edge section of the second surface may not be maintained due to the indentation. As a consequence, when the base surface of the spark plug and the second surface of the gasket come into close contact, gaps may occur in areas having the indentation, which may in turn cause a loss in the airtightness between the combustion chamber and the spark plug.

In this regard the second section is provided between the plurality of convex portions provided on the inside circumferential edge surface of the gasket, as a counter measure. The second section is a section which is formed thinner than the thickest part of the gasket, and thicker than the first section. That is, the second section is formed to a thickness which is nearer to the thickness of the first section, than to the thickest part of the gasket. Furthermore, since the inner circumferential edge surface of second section of the gasket can be formed to be closer to a flat surface, a size of the gap occurring between the base surface of the spark plug and the second section of the gasket becomes smaller when in close contact with each other, thus maintenance of the airtightness between the combustion chamber and the spark plug is enhanced.

BRIEF DESCRIPTION OF THE DRAWINGS

In the accompanying drawings:

FIG. 9 (a) is a diagram showing a spark plug with the plug base surface formed on an oblique surface thereof and FIG. 9(b) is an enlarged view of a section B shown in FIG. 9(a).

PREFERRED EMBODIMENTS

First Embodiment

Figure 1:
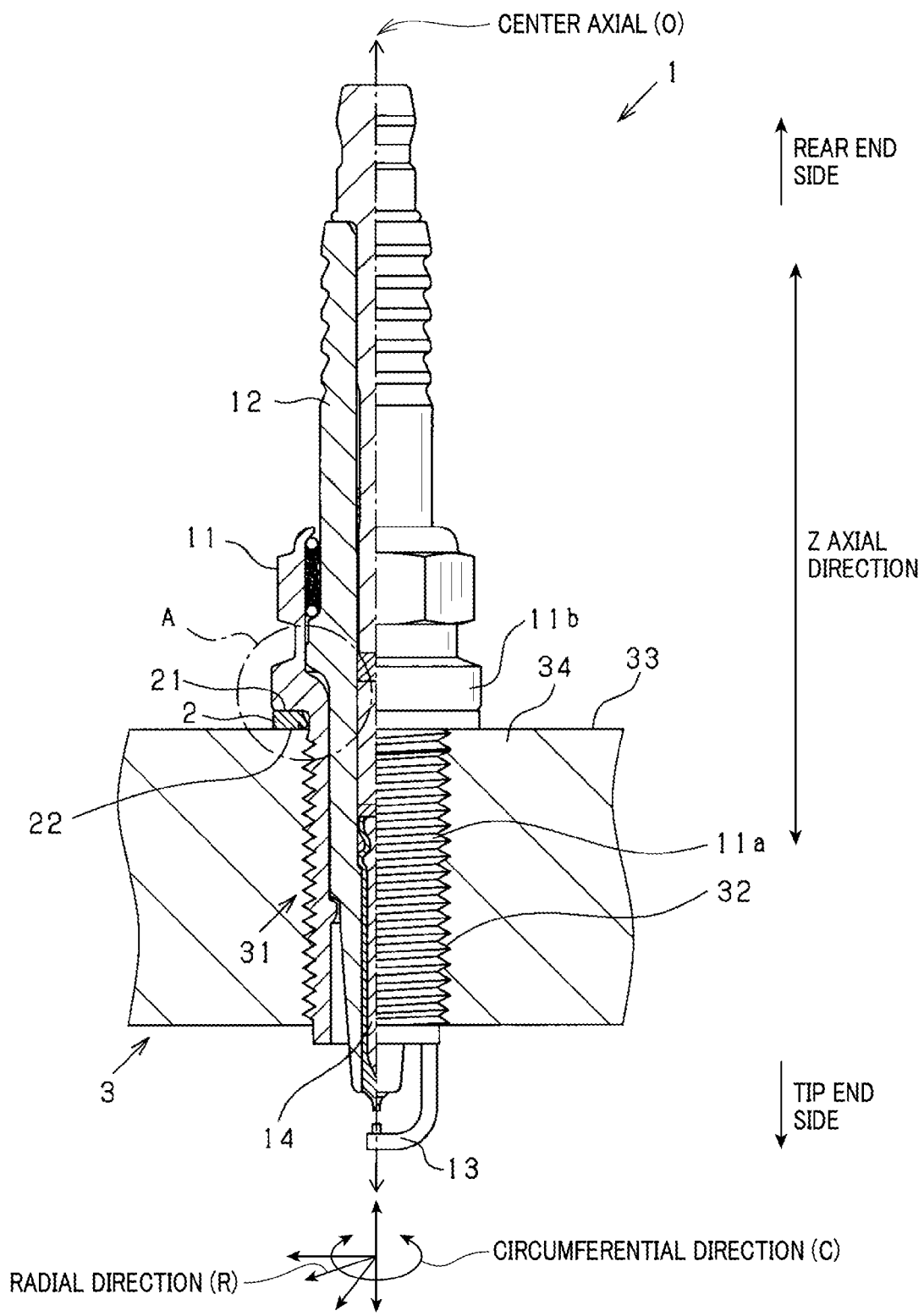
FIG. 1 is a half cross sectional drawing showing a spark plug and a gasket according to a first embodiment.

Preferred embodiments of the present disclosure will now be described with reference to the drawings. FIG. 1 shows a half cross sectional view of a spark plug 1 and a gasket 2 mounted on an engine.

A center axis (O), a circumferential direction (CIRC), a radial direction (RAD) and length wise direction (Z) of the spark plug are shown in FIG. 1. Also, a respective front end side and rear end side of the spark plug are also indicated. An inner circumferential edge surface of a gasket hereinafter refers to a circumferential edge surface at the inner side of the gasket.

The spark plug 1 is thread screwed to a wall section 34 of a cylinder head which forms a combustion chamber of an engine through the gasket 2, by fastening using a defined fastening torque.

The spark plug 1 is provided with a substantially cylindrical metal fitting 11, a substantially cylindrical insulator 12 retained on an inner circumferential surface of the metal fitting 11, and a substantially column-shaped main electrode 14 which is retained inside of the insulator 12. The spark plug 1 is further provided with a ground electrode 13 which is projected towards an end (namely a front end) into the combustion chamber 3 of the metal fitting 11, and is positioned to oppose a front end side of the main electrode 14.

A thread portion 11a is formed on the metal fitting 11. A plug large diameter section 11b which is larger than a diameter of the thread portion 11a is formed on a side opposite to the combustion chamber 3, with respect to the thread portion 11a.

Additionally, a fitting hole section 31 is formed on the wall section 34 of the cylinder head, and a fitting thread section 32 is provided to fit the spark plug 1 to the inner circumferential surface of the wall section 34. The spark plug 1 is fitted onto the wall section 34 of the cylinder head by screwing the thread portion 11a with the fitting thread section 32.

Figure 2:
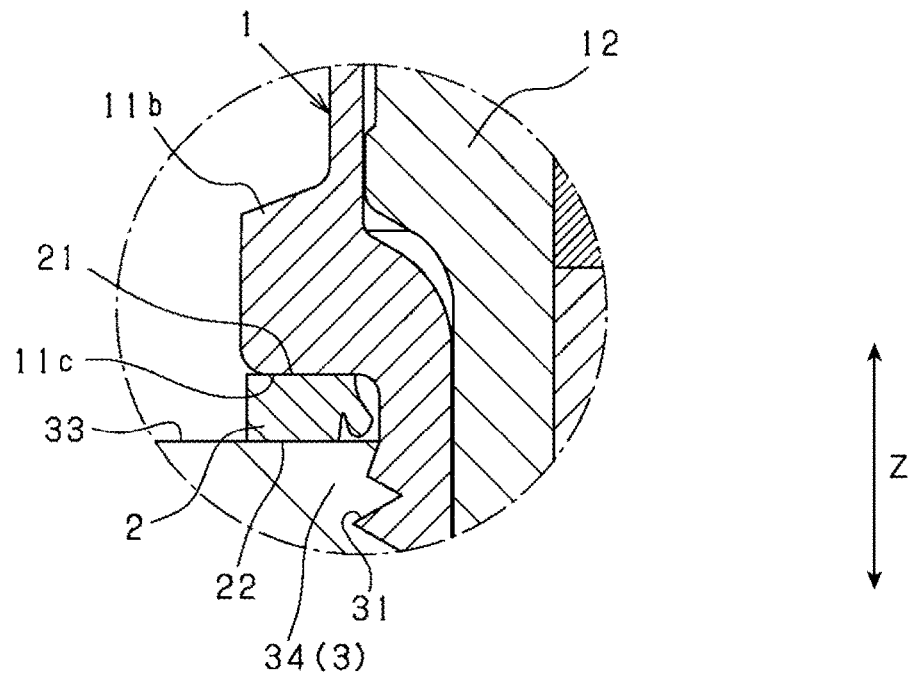
FIG. 2 is an enlarged cross sectional view showing a part of A shown in FIG. 1.

The FIG. 2 shows an enlarged cross sectional view showing a main part of the gasket 2 provided between the spark 1 and the combustion chamber 3. An outside (2-OUT) and an inside (2-IN) of the gasket 2, refer to a respective inner radial side and outer radial side of the front end surface 22 of the gasket 2. Incidentally, FIG. 2 shows a region labeled [A] in FIG. 1.

A base surface of a wall section 33 is formed as a surface disposed perpendicular in an axial direction Z of the spark plug 1 on a side opposite to the combustion chamber 3. A plug base surface 11c substantially parallel to the base surface of the wall section 33 is formed on a surface of a front end side of the plug large diameter section 11b. The gasket 2 is in contact with the plug base surface 11c.

The gasket 2 is formed in an angular shape using a flat plate made from a copper alloy. The gasket 2 is provided with a basal end surface 21 (second surface) as a surface on the plug base surface 11c, and a front end surface 22 (as a first surface) on the base surface of the wall section 33.

Figure 3:
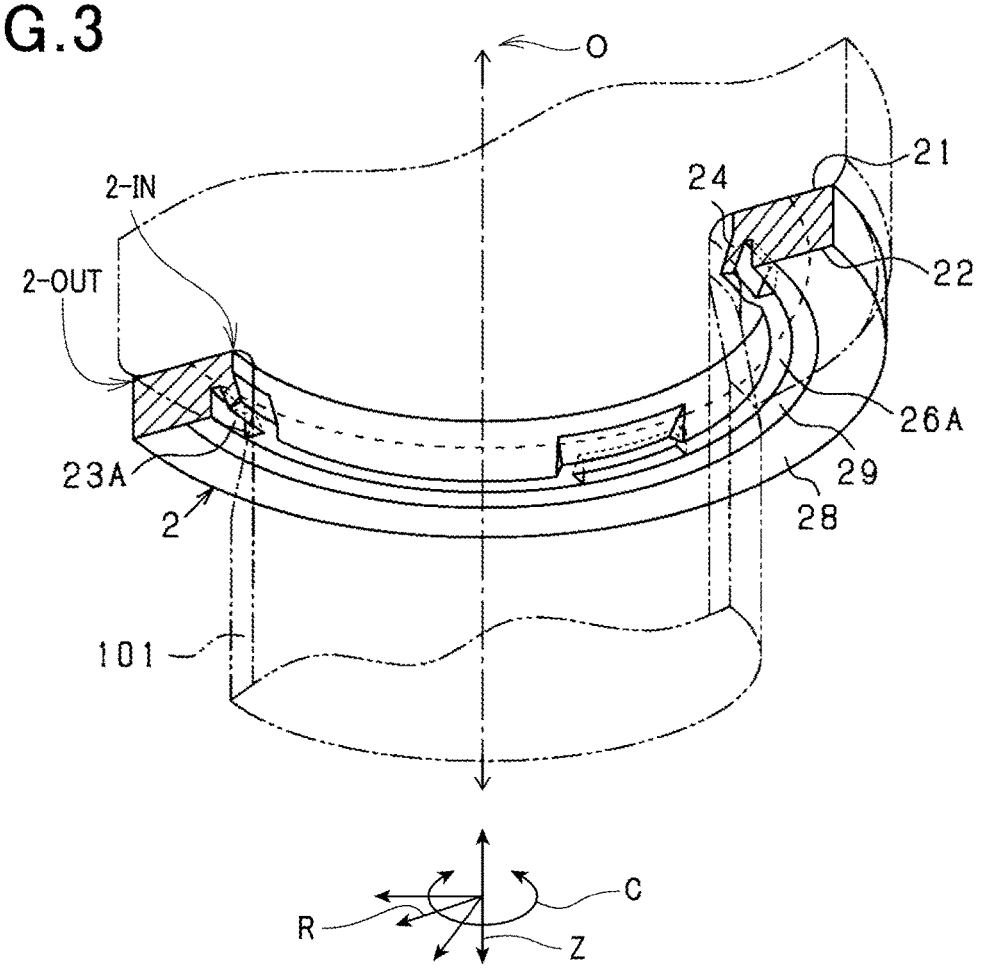
FIG. 3 is a perspective view showing an exterior of a front end surface of the gasket according to the first embodiment.

FIG. 3 is a perspective view showing an exterior of the front end surface 22 of the gasket. As shown in FIG. 3, the gasket 2 is formed in an angular shape. A plurality of concave portions 23A provided as grooves intermittently disposed along a circumferential direction, are formed on an inner circumferential edge surface of the front end surface of the gasket 2. Additionally, the convex portions 24 are each formed on an inner radial side of the gasket 2 projecting to the inner radial side thereof, with respect to the concave portions 23A. An inner diameter of the gasket 2 is smaller by a size of the convex portions 24. More specifically, the inner diameter of the gasket becomes smaller than an inner diameter of the thread portion 11a. A result, a risk of the gasket 2 slipping off the spark plug 1 can be further suppressed.

Figure 4:
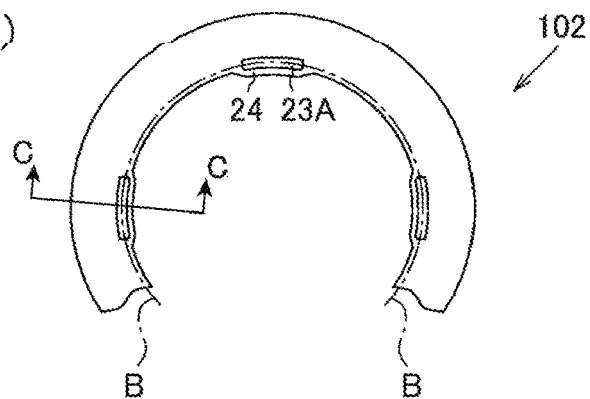
FIG. 4 (a) is a plan view showing a front end surface of a conventional gasket and FIG. 4 (b) is a cross section view across a line B-B shown in FIG. 4 (a)
Figure 4:
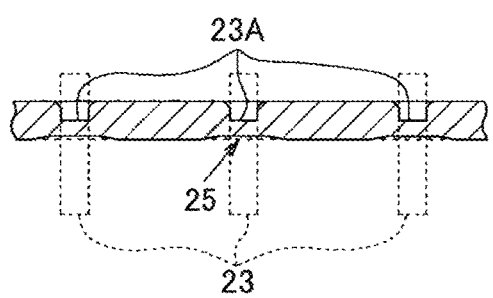

A conventional gasket 102 having the concave portion 23A and the convex portions 24 only disposed on an inner circumferential edge surface of a front end surface 22 of the gasket 102 is shown in FIG. 4(a). When the gasket 102 is manufactured, the concave portions 23A are formed by pressing the gasket 102 with a first pressing jig provided with a plurality of convex portions corresponding to a shape of the concave portions 23A, with the gasket 102 in contact with the plug base surface 11c of the spark plug 1. At this point, the base end surface 21 of the gasket 102 presses on to the plug base surface 11, when the inside 2-IN of the front section 22 is pressed with the first pressing jig. As shown in FIG. 4 (b), as a result, a first recessed portion 25 is formed as an indentation on a section which is a reversed-side of the concave portion 23A, and the first section 23 of the gasket 102 being a section formed by the concave portions 23A and the first recessed portions 25 is thinned to a predetermined thickness. Furthermore, a the thickness of the first section 23 of the gasket 102 is thinner than a thickness of other parts of the gasket 102, and the inside section of the base end surface 21 cannot maintain a flat surface due to the first recessed portion 25. As a consequence, a gap, for example, may occur in an area where the first recessed portion 25 is formed when the plug base surface 11c of the spark plug 1 and the base end surface 21 of the gasket 102 make contact, and the air tightness between the combustion chamber 3 and spark plug 1 may be decreased. In this way, not only the first recessed portion 25, but also a convex portion may occur as an indentation.

Figure 5:
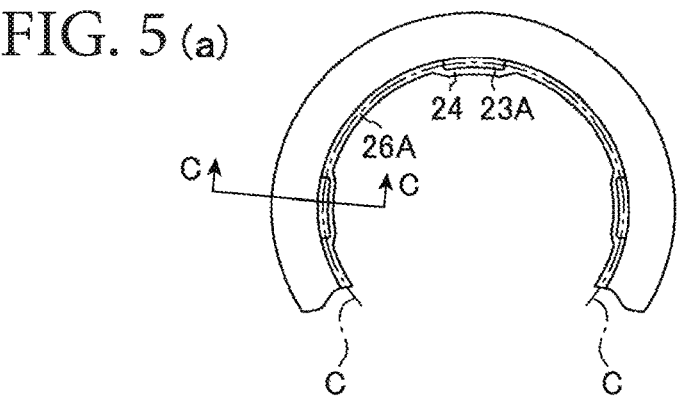
FIG. 5 (a) is a plan views showing a front end surface of the gasket according to the first embodiment, FIG. 5 (b) is a cross section view of C-C shown in FIG. 5 (a) and FIG. 5 (c) is cross sectional view of an arrow line C-C shown in FIG. 5 (a)
Figure 5:
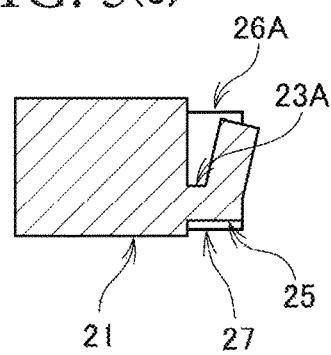
Figure 5:
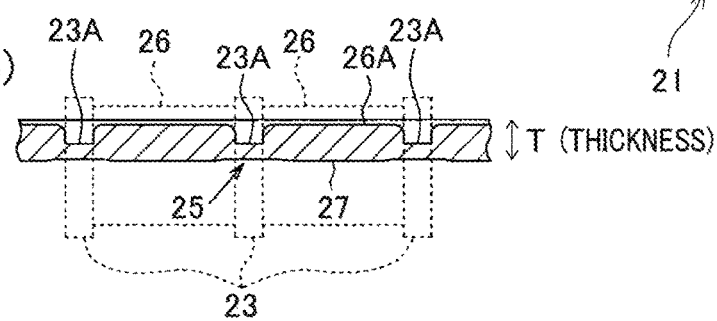

As a countermeasure, the gasket 2 is provided with a surface pressing section 26A formed between an entire plurality of concave portions 23A on the inner circumferential edge surface of the front end surface 22 of the gasket 2, as shown in FIG. 3 and FIG. 5 (*a*). Specifically, the gasket 2 described is provided with the surface pressing section 26A continuously formed between the plurality of concave portions 23A.

The gasket 2 may be produced by performing a first process and a second process described below.

In the first process, the plurality of concave portions 23A which are grooves intermittently disposed along a circumferential direction, are formed on the inner circumferential edge surface of the front end surface 22 of a gasket precursor. The grooves are formed by pressing a first pressing jig on to the flat plate made of the copper alloy formed in an angular shape. The flat plate made of a copper alloy is referred to as a gasket precursor hereinafter. In this process, by forming the plurality of concave portions 23A on the inside section of the gasket precursor, the convex portions 24 are formed on an inner radial side on a section on an inner radial side thereof, thus each projecting to the inner radial side. The convex portions 24 are formed on the inner radial side with respect to the concave portions 23A. The first process may therefore also be referred to as a process of forming the plurality of concave portions 23A and convex portions 24 on the inner side section of the front end surface 22 of the gasket precursor.

In the second process, an arc shaped surface pressing section 26A is formed between the entire plurality of concave portions 23A, by pressing the gasket precursor using a second pressing jig provided with a plurality of arc shaped portions corresponding to the shape of the pressing section 26A. A depth of the surface pressing section 26A formed in the second process is shallower than a depth of a concave portion 23A.

Figure 9:
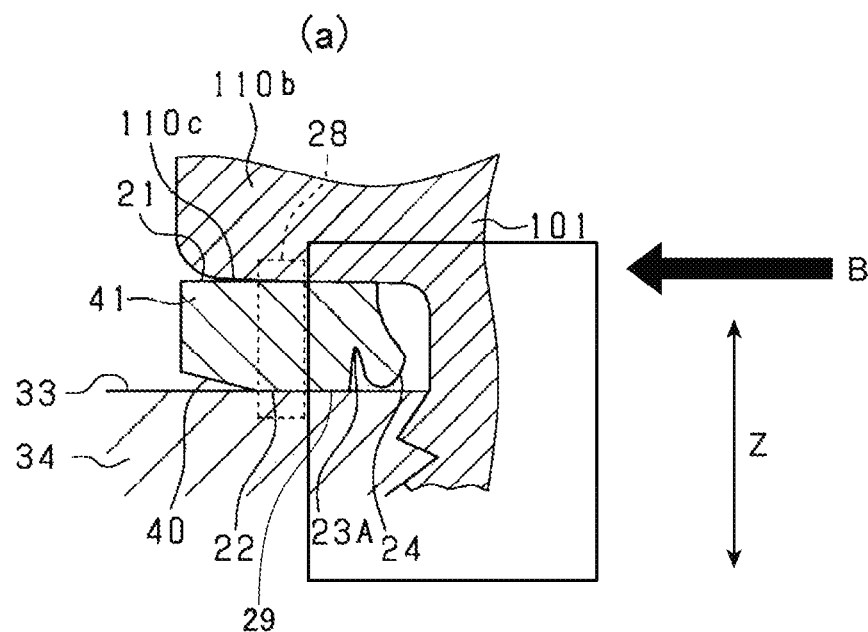
Figure 9:
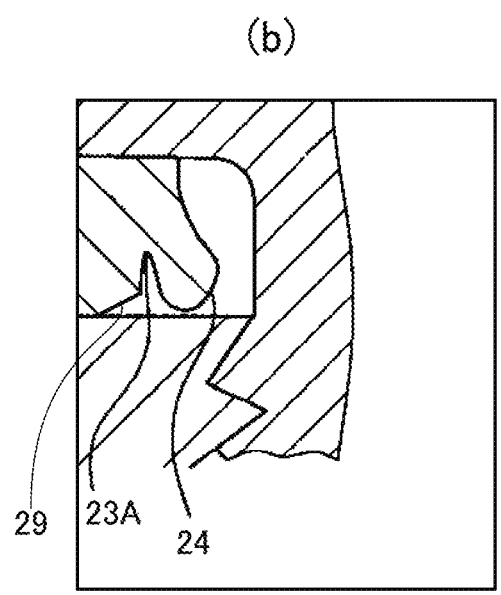

The inner circumferential edge surface of the front end surface 22 of the gasket precursor is thus pressed using the respective first pressing jig and the second pressing jig, by performing the respective first and second process described above. As a result, the copper material positioned on an outside of the concave portion 23A and the surface pressing section 26A also adjacent thereto is drawn towards a side of the base end surface 21 and so called [drooping] occurs at the front end surface 22 of the gasket precursor. Furthermore, a first oblique portion 29 which is oblique towards the inner side, away from the wall section 34 of the cylinder head, is formed by the so called drooping as a consequence (refer to FIG. 3 and FIGS. 9 (*a*) and (*b*)). The first oblique portion 29 shown in FIG. 9 (*a*) is when the gasket is tightly fixed to the spark plug and the combustion engine wall 34 and the first oblique portion shown in FIG. 9 (*b*), when the gasket is loosely fixed thereto, in which an inclination of the first oblique portion 29 is more prominent.

The first and second process are both performed with the gasket precursor in contact with the plug base surface 11*c*. As a result, when the first process is performed, the first recessed portion 25 is formed as an indentation in an area on the reversed-side of the concave portion 23A, at the base end surface of the gasket precursor, as shown in FIG. 5(*b*). During the second process, a second recessed portion 27 occurs as an indentation on a reversed-side of the surface pressed portion 26A, as the base end surface 21 of the gasket precursor is pressed by the plug base surface 11*c*, when the surface pressing section 26A is formed by pressing the gasket precursor with the second pressing jig.

The gasket manufactured using the first and second process is provided with the features described below.

A thickness of the second section 26 which is the section including the surface pressing section 26A and the second recessed portion 27 formed thereon, is thinner than the third section 28 being the thickest part of the gasket 2, and thicker than the first section 23. The second section 26 is disposed on an outside of the first section 23 and second section 26. That is, the thickness of the second section 26 of the gasket can be formed closer to the thickness of the first section 23, than the thickness of third section 28. Furthermore, due to the second recessed portion 27 occurring between the first recessed portions 25, a state therebetween all of the first recessed portions 25 can be closer to a state of the first recessed portions 25 at the base end surface 21. The state here refers to 'a flatness level' thereof. As a result, the inner circumferential edge surface of the base end surface 21 can be configured nearer to the flat surface.

It is noted that, as the first process entails forming the concave portion 23A and the first recessed portion 25, this process may also be called a process of forming the first section 23 on the inner circumferential edge surface of the gasket precursor. Additionally, as the second process entails forming the surface pressing section 26A and the second recessed portion 27, it may also be called a process of forming the second section 26 on the inner circumferential edge surface of the gasket precursor.

The following superior effects are obtained from the gasket 2 and manufacturing method thereof according to the first embodiment.

Effects

1. The surface pressing section 26A is formed between the entire concave portions 23A intermittently disposed at the inner circumferential edge surface of the surface end section 22 of the gasket 22. As a consequence, since the second recessed portion 27 is formed by formation of the surface pressing section 26A on the base end surface 21 of the gasket, unevenness of the inner circumferential edge surface of the side of base end surface 21 can be suppressed, even when the first recessed portion 25 occurs on the base end surface 21 of the gasket 2 due to the formation of the concave portions 23A. Furthermore, since the inner circumferential edge surface of the base end surface 21 the gasket 2 can be formed disposed near to the flat surface, a size of gaps occurring between the base surface of the spark plug and the second section of the gasket is small when in close contact with each other, thus maintenance of airtightness between the combustion chamber 3 and the spark plug 1 is enhanced.

2. Additionally, adverse effects of deformation occurring in a section on the outside, with respect to the first oblique portion 29, at the front end surface 22 of the gasket may be suppressed, as a result of the formation of the surface pressing sections 26A.

3. The flat plate made from the copper alloy which forms the gasket 2 is softer than a flat plate made of stainless steel. As a result, when the concave portions 23A and the surface pressing section 26A are formed on the base end surface 21 of the gasket 2, only a relatively small load is needed to be applied to the gasket 2 by the respective first and second pressing jig. Additionally, it is considered that as the gasket 2 formed from the flat plate made from the copper alloy is pressed on to the spark plug 1, the gasket 2 deforms to a shape of a surface in contact therewith, when the spark plug 1 is mounted onto the cylinder head wall 34. As a result, the size of a gap occurring on the inner circumferential edge surface is further reduced, when the plug base surface 11c of the spark plug 1 and the base end surface of the gasket 2 come into contact. It is anticipated that the airtightness can be enhanced further as a consequence.

The first embodiment may also be modified as follows.

The gasket according to the first embodiment is configured of a flat plate made of angular shaped copper alloy. However, the gasket 2 may be configured of a flat plate made of angular shaped stainless steel.

The first embodiment describes the surface pressing section 26A formed between an entirety of the concave portions 23A at the inner circumferential edge surface of the front end surface 22 of the gasket 2. However, it is not necessary to form the surface pressing section 26A the entirety of concave portions 23A. That is, a surface pressing section 26A may be formed in part between the concave portions 23A.

Figure 6:
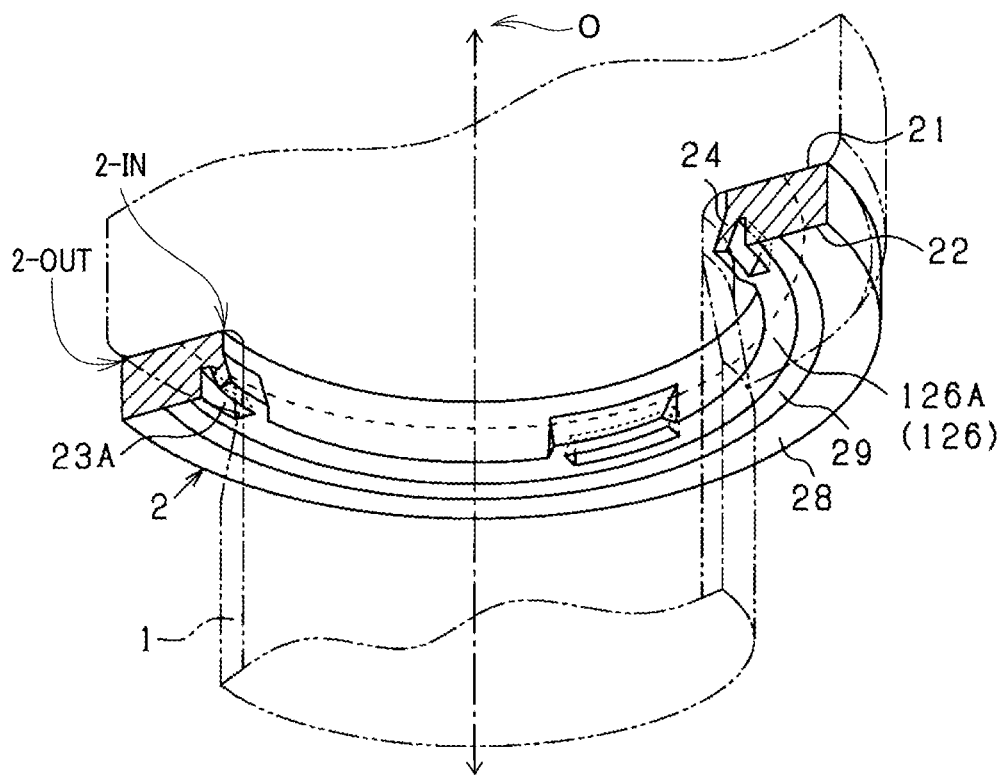
FIG. 6 is a perspective view showing an exterior of a front end surface of the gasket according to another (comparative) example.

In the first embodiment, the surface pressing section 26A (the second section 26) is formed between the entirety of concave portions 23A at the inner circumferential edge surface of the front end surface 22 of the gasket 2. In this regard, as shown in FIG. 6, a surface pressing section 126A (a second section 126) may be formed around an entire circumference on the inner circumferential edge surface of the front-end surface 22 thereof. In the comparative example, the second pressing jig is pressed around the entire circumference of the inner circumferential edge surface of the front end surface 22 of the gasket 2, with the base end surface 21 of the gasket 2 in contact with the plug base surface 11c, at a point of forming the surface pressing section 126A. A surrounding area of the first recessed portions 25, formed on the reverse side as a consequence of the concave portions 23A, can be pressed by pressing a surrounding area of the concave portions 23A. As a result, the inner circumferential edge surface of the base end surface 21 may be formed closer to the flat surface.

In the first embodiment, the first and second pressing jigs used for the respective first and second process are different pressing jigs. However, the first and second pressing jigs may also be formed as the same pressing jig. More specifically, the same pressing jig refers to a pressing jig provided with a plurality of convex portions corresponding to the shape of the concave portions 23A and the plurality of arc shaped portions corresponding to the shape of the pressing section 26A. As a result of employing the same pressing jig, both the first section 23 and the second section 26 can be formed by a single operation and simplification of the manufacturing process of the gasket 2 may be actualized. Additionally, by forming the first pressing jig and the second pressing jig on the same pressing jig, in the first and second process, pressing of areas other than areas allocated for pressing can be avoided, therefore the first section 23 and the second section 26 may each be formed in the correct position.

[1] The gasket 3 according to the first embodiment is applied to the spark plug 1 so that the plug base surface 11c is substantially parallel to the base surface of the wall section 33. However, the gasket 2 may be applied to the spark plug 101 configured with the plug base surface 110c as the oblique surface, facing towards the outside thereof, oblique towards a direction away from the cylinder wall section 34.

Figure 7:
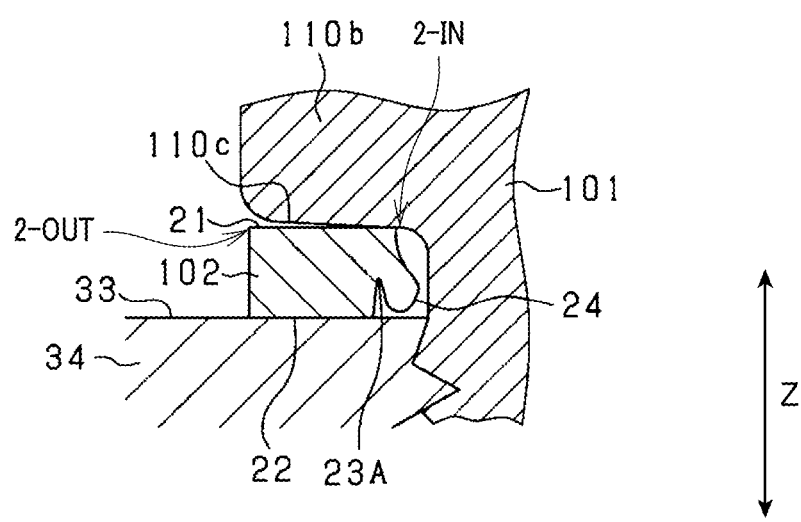
FIG. 7 is a diagram showing a spark plug with a the plug base surface formed on an oblique surface thereof, applying a conventional gasket thereto.

Supposing that the conventional gasket 102 shown in FIG. 4(a) is applied to the configuration of the spark plug 101 shown in FIG. 7. In this case, the inner circumferential edge surface of the base end surface 21 of the gasket 10 is able to make contact with the plug base surface 110c of the spark plug 101. In contrast, with respect to the inner side section of the base end surface 21, an outside section is not able to make contact with the plug base end surface 110c of the spark plug 101. At this point, a gap occurs when the plug base surface 110c of the spark plug 101 and the base end surface 21 of the gasket 102 make contact, due to the formation of the first recessed portions 25 on the base end section of the gasket 102, which is formed as a consequence of the concave portions 23A. The airtightness between the combustion chamber 3 and the spark plug 101 may decrease as a result.

On the other hand, supposing that the gasket 2 according to the first embodiment is applied to the configuration of spark plug 1. In this case, the gasket 2 forms the second section 26 in addition to the first section 23 on the inner side circumferential edge surface, thus the inner circumferential edge surface of the base end section 21 of the gasket 2 may be disposed even closer to the flat surface shape. The size of a gap occurring can thus be decreased when the plug base surface 110c of the spark plug 101 and the inner circumferential edge surface of the base end surface 21 of the gasket 2 make contact. Furthermore, a decrease of airtightness between the combustion chamber 3 and the spark plug 101 may also be suppressed.

A Second Embodiment

A difference between the second embodiment and comparative example 1 will now be described.

In the comparative example [1] the gasket 2 is applied to the spark plug 101 which is provided with the plug base surface 110c configured as the oblique surface facing towards the outside, oblique towards the direction away from the cylinder head wall section 34. In this case, the inner circumferential edge surface of the base end surface 21 of the gasket 2 is in contact with the oblique surface being the plug base surface 110c of the spark plug 101, and the front end surface 22 of the third section 28 is in contact with the cylinder head wall section 34. At this point, as the spark plug 101 presses onto the inner circumferential edge surface of the base end surface 21 of the gasket, a force which occurs at the front end surface 22 of the third section 28 has the highest strength at the inner circumferential edge surface 2-IN of the front end surface 22 and becomes weaker closer to an outside circumferential edge surface 2-OUT of the front end surface 22. It is considered that the force therefore becomes weakest at the outer circumferential edge surface 2-OUT of the frontend surface 22, and as a consequence the outer circumferential edge surface of the frontend surface 22 of the gasket 2 is not able to make strong contact with the cylinder head wall 34. That is, the strength of the force at the inner circumferential edge surface of the front end surface 22 of the gasket 2 which spreads to the outer circumferential edge surface is not sufficient enough to maintain airtightness between the combustion chamber 3 and the spark plug 101. In such a case, in consideration of maintaining airtightness between the chamber 3 and the spark plug 101, the force spreading to the exterior circumferential edge surface 2-OUT in this respect is thought to be of little use.

Figure 8:
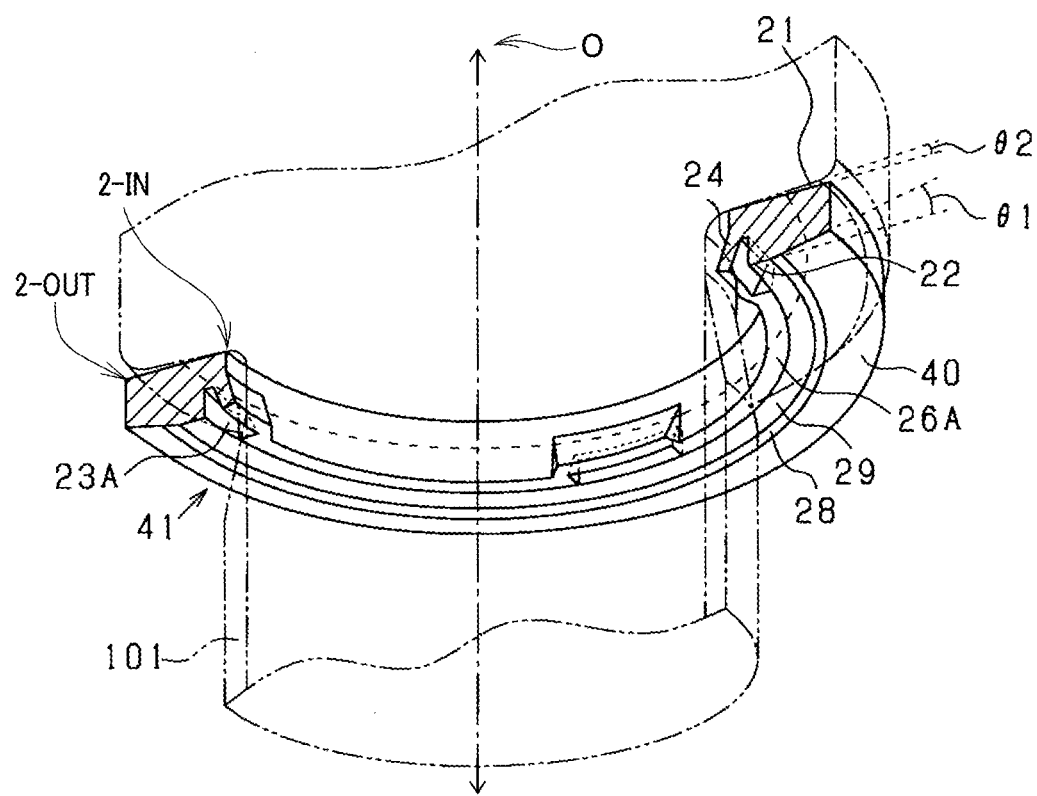
FIG. 8 is a perspective view showing an exterior of a front end surface of a gasket according to a second embodiment.

In order to compensate for issues above, a gasket 41 shown in FIG. 8 is considered. The gasket 41 is configured so that the second oblique section 40 is disposed on an outside of the third section 28 and adjacent thereto. The second oblique section 40 is oblique towards an outer circumference thereof, away from the wall section 34.

The gasket 41 may be manufactured by performing a third process and fourth process, in addition to the first and second process, described above.

As the respective first and second process are performed as described above, only the third and fourth process will be described hereinafter.

The third process is a process of forming the second oblique section 40 by pressing a third pressing jig onto a position of the outside, with respect to the third section 28, which is also adjacent thereto. In this process, the second oblique section 40 is formed oblique towards the outside, in a direction away from the cylinder head wall section 34. The third pressing jig is provided with an oblique surface having an oblique angle which is the same as an angle $\theta 1$ described herein after. In the process, the second oblique section 40 is formed such that the angle $\theta 1$, which is formed between a perpendicular surface, perpendicular towards an axial line of the spark plug, and a surface of the second oblique section 40 is greater than an angle $\theta 2$, which is formed between the perpendicular surface, perpendicular to the axial line of the spark plug and the plug base surface 110c of the spark plug, being an oblique surface. As a result, when the gasket 41 is applied to the spark plug 101, a situation of the second oblique section 40 of the front end surface 22 making contact with the wall section 34 of the cylinder head can be avoided with high certainty. Furthermore, a section which makes contact with the wall section 34 of the cylinder head, is the third section 28 being the thickest part of the gasket 41, positioned on the outside of the second oblique section 40. Specifically, the force occurring at the front end surface 22 by pressing of the spark plug 101 on to the inner circumferential edge surface of the base end surface 21, is applied mainly to the front end surface 22 of the third section 28 which is in contact with the wall section 34. According to the configuration described, the wall section 34 of the cylinder head and the front end surface 22 of the third section 28 are in close contact with high strength, thus enhancement of airtightness between the combustion chamber 3 and the spark plug 101 may be achieved.

In contrast, in the third process, once the first pressing jig is applied to the gasket precursor by pressing, there is a case of the pressing jig not dislodging when a surface thereof is engraved to form the concave portions 23A on the inner circumferential edge surface of the front end surface 22 thereof. It is considered that, in a process of releasing the first pressing jig from the gasket precursor, the gasket itself will move with the first pressing jig in the direction in which the pressing jig is moved. In this regard, as a countermeasure, it is considered that the gasket precursor may be fixed using a different pressing jig, as a method to remove, more specifically, to pull the first pressing jig off the gasket precursor.

Incidentally, in the third process, the second oblique section 40 is formed by pressing the third pressing jig. During a period in which the third pressing jig is pressed on the surface thereof the gasket precursor is in a fixed state. Additionally, since the second oblique section 40 formed by pressing the gasket precursor is disposed on the outside of the position in which the concave portions 23A are formed, the oblique section 40 will not interfere with the first process.

In consideration of the above, the fourth process according to the comparative example is a process of pulling the first jig off the gasket precursor with the third pressing jig in a pressed state on the gasket precursor. Since the third pressing jig fixes the gasket precursor, the gasket precursor may be maintained in the fixed state during the fourth process by continuously pressing the precursor after the third process. Furthermore, the first pressing jig is removable from the gasket precursor in the fixed state. The third pressing jig used to form the second oblique section in the third process is also used to fix the gasket precursor when the first pressing jig is pulled off the gasket precursor, once the third process is finished.

The second embodiment may also modified as described below.

The gasket 41 in the second embodiment is formed so that the angle $\theta 1$, which is formed between a perpendicular surface, perpendicular towards an axial line of the spark plug and the surface of the second oblique section 40 is greater than the angle $\theta 2$, which is formed between the perpendicular surface, perpendicular to the axial line of the spark plug and the plug base surface 110c of the spark plug, being the oblique surface. However, the gasket 41 may also be configured so that the angle $\theta 1$ is smaller than the angle $\theta 2$, if the angle $\theta 1$ is greater than 0.

The process of manufacturing the gasket 4 according to the second embodiment includes the fourth process in which the gasket precursor is fixed by pressing the precursor with the third pressing jig. However, it is not essential to use the third pressing jig, and fixing of the gasket precursor may also be carried out using another jig.

DESCRIPTION OF SYMBOLS 1 spark plug, 2, 41 gasket, 3 combustion chamber, 22 chamber contact surface (front end surface of gasket), 23 first section, 23A concave portion, 24 convex portion, 26, 126 second section, 29 first oblique section, 34 wall section.

The invention claimed is:

1. An angular gasket which is used when mounting a spark plug to a wall section of an engine chamber, the angular gasket having a center axis passing through a center point, a circumferential direction around a circumference thereof, and a radial direction being radial from an inner circumferential edge to an outer circumferential edge thereof; the angular gasket comprising:
  a first section with a predetermined thickness, having a plurality of concave portions which are grooves intermittently disposed along the circumferential direction, formed on a first surface being a surface that is a side of the wall section of the gasket, at a radial inside of the gasket;
  convex portions on a section of the radial inside of the gasket, and
  a second section disposed between the plurality of concave portions on the inner circumferential edge surface of the gasket, wherein
  the convex portions are disposed radially inside of the concave portions projecting toward the inner radial side thereof, the gasket has a thickest section,
  the second section is provided with a thickness, the thickness of the second section being thinner than the thickest section of the gasket, and greater in thickness than the first section, and
  the spark plug is provided with
  a base surface, which is in contact with a second surface, the second surface being a surface which opposes the side of the wall section of the gasket, the base surface being an oblique surface which is oblique towards a direction away from the wall section, towards an outside thereof.

2. The gasket for a spark plug according to claim 1, wherein
the second section is continuously formed between an entirety of the concave portions, at the inner circumferential edge surface of the gasket.

3. The gasket for a spark plug according to claim 2, wherein
the first surface is provided with
a first oblique section which is formed on an outside of the first section and the second section, and adjacent to the first section and the second section, the first oblique section being oblique in a direction away from the wall section of the combustion chamber and disposed radially inside.

4. The gasket for a spark plug according to claim 2, the gasket further comprising:
a second surface on an opposing side from the side of the wall section of the gasket, wherein
the second surface is recessed on the first section and the second section.

5. The gasket for a spark plug according to claim 2, wherein
the gasket has a total circumference extending fully on an inside section in the circumferential direction, and
the second section is formed on the total circumference of the gasket.

6. A manufacturing method of a gasket for a spark plug, according to claim 2, characterized in that the method comprises:
a first step of forming the first section which is the section being thinned to the predetermined thickness, and forming the plurality of concave portions as grooves intermittently disposed at an inner circumferential edge of the gasket; and
a second step of forming the second section having the thickness which is thinner than the thickest part of the gasket and the thicker than the first section, the second section being disposed between the plurality of concave portions on the inner circumferential edge surface of the gasket; wherein:
the second surface being the surface on the side opposing the side of the wall section of the gasket is in close contact with the base surface of the spark plug when the first step and the second step are performed.

7. A spark plug according to claim 2, the spark plug comprising:
the gasket for a spark plug.

8. The gasket for a spark plug according to claim 1, wherein
the first surface is provided with
a first oblique section which is formed on an outside of the first section and the second section, and adjacent to the first section and the second section, the first oblique section being oblique in a direction away from the wall section of the combustion chamber and disposed radially inside.

9. The gasket for a spark plug according to claim 1 the gasket further comprising:
a second surface on an opposing side from the side of the wall section of the gasket, wherein
the second surface is recessed on the first section and the second section.

10. The gasket for a spark plug according to claim 1, wherein
the gasket has a total circumference extending fully on an inside section in the circumferential direction, and
the second section is formed on the total circumference of the gasket.

11. The gasket for a spark plug according to claim 10, the gasket further comprising:
a third section; wherein
the third section is a part of the gasket which has a greatest thickness, positioned on an outer circumferential side of the first section and the second section; and
the first surface is provided with a second oblique section formed thereon, the first section being disposed on an outside of the third section, and adjacent to the third section and oblique in a direction away from the wall section of the combustion chamber.

12. The gasket for a spark plug according to claim 11, the spark plug having an axial line, wherein
the second oblique section of the gasket has a surface, the surface of the second oblique section is opposed to the surface of the wall section of the chamber, the surface of the second oblique section and a perpendicular surface being a perpendicular surface towards the axial line of the spark plug, form a first angle, and
the perpendicular surface and the base surface are perpendicular to the axial line form a second angle; wherein
the first angle is configured to be larger than the second angle.

13. The manufacturing method of a gasket for a spark plug, according to claim 12, characterized in that the method comprises:
a first step which forms the first section which is a section formed to the predetermined thickness, by pressing using a first pressing jig to form the plurality of concave portions which are grooves intermittently disposed along the circumferential direction at an inner circumferential edge of the gasket;
a second step which forms the second section to a thickness which is thinner than the thickest section of the gasket and greater in thickness than the first section, between the plurality of concave portions on the inner circumferential edge surface of the gasket by pressing, using a second pressing jig;
a third step forming the second oblique section, formed thereon, in a position on an outside of the third section, and adjacent to the third section, the second oblique section being oblique in a direction away from the wall section of the combustion chamber and toward an outer circumferential side;
a fourth step of pulling the first pressing jig off the gasket with the third pressing jig in a pressed state, wherein:
the first process and second process are performed with the second surface of the gasket in contact with the base surface of the spark plug.

14. The manufacturing method of a gasket for a spark plug, according to claim 11, characterized in that the method comprises:
a first step which forms the first section which is a section formed to the predetermined thickness, by pressing using a first pressing jig to form the plurality of concave portions which are grooves intermittently disposed along the circumferential direction at an inner circumferential edge of the gasket;
a second step which forms the second section to a thickness which is thinner than the thickest section of the gasket and greater in thickness than the first section, between the plurality of concave portions on the inner circumferential edge surface of the gasket by pressing, using a second pressing jig;

a third step which forms the second oblique section, which is formed thereon, in a position on an outside of the third section, and adjacent to the third section, the second oblique section being oblique in a direction away from the wall section of the combustion chamber and toward an outer circumferential side; and a fourth step of pulling the first pressing jig off the gasket with the third pressing jig in a pressed state, wherein:

the first process and second process are performed with the second surface of the gasket in contact with the base surface of the spark plug.

15. A manufacturing method of a gasket for a spark plug, according to claim 1, characterized in that the method comprises:

a first step of forming the first section which is the section being thinned to the predetermined thickness, and forming the plurality of concave portions as grooves intermittently disposed at an inner circumferential edge of the gasket; and a second step of forming the second section having the thickness which is thinner than the thickest part of the gasket and the thicker than the first section, the second section being disposed between the plurality of concave portions on the inner circumferential edge surface of the gasket; wherein:

the second surface being the surface on the side opposing the side of the wall section of the gasket is in close contact with the base surface of the spark plug when the first step and the second step are performed.

16. The method for processing the gasket for a spark plug according to claim 15, characterized in that:

the first pressing jig and the second pressing jig are formed using the same pressing jig.

17. A spark plug according to claim 1, the spark plug further comprising:

the gasket for a spark plug.

18. An angular gasket which is used when mounting a spark plug to a wall section of an engine chamber, the angular gasket having a center axis passing through a center point, a circumferential direction around a circumference thereof, and a radial direction being radial from an inner circumferential edge to an outer circumferential edge thereof; the angular gasket comprising:

a first section with a predetermined thickness, having a plurality of concave portions which are grooves intermittently disposed along the circumferential direction, formed on a first surface being a surface that is a side of the wall section of the gasket, at a radial inside of the gasket;

convex portions on a section of the radial inside of the gasket, and a second section disposed between the plurality of concave portions on the inner circumferential edge surface of the gasket, wherein the convex portions are disposed radially inside of the concave portions projecting toward the inner radial side thereof, the gasket has a thickest section, the second section is provided with a thickness, the thickness of the second section being thinner than the thickest section of the gasket, and greater in thickness than the first section, the second section is continuously formed between an entirety of the concave portions, at the inner circumferential edge surface of the gasket, and the spark plug is provided with a base surface, which is in contact with a second surface being a surface which opposes the side of the wall section of the gasket, the base surface being an oblique surface which is oblique towards a direction away from the wall section, towards an outside thereof.

* * * * *